United States Patent Office 2,905,706
Patented Sept. 22, 1959

2,905,706

2-NITRO-3,4,6-TRICHLOROPHENYL BENZOATES

Jacqueline G. Sims, Midland, and Clarence L. Moyle, Clare, Mich., assignors to The Dow Chemical Company, Midland, Mich., a corporation of Delaware No Drawing. Application August 9, 1957
Serial No. 677,200

7 Claims. (Cl. 260—471)

The present invention relates to 2-nitro-3,4,6-trichlorophenyl benzoates corresponding to the general formula

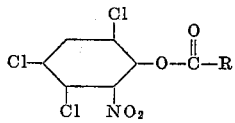

In this and succeeding formulas, R represents an aryl radical. The term "aryl" as herein employed refers to the aromatic radicals of the benzene series whether substituted or unsubstituted with one or more substituents including chlorine, bromine, lower alkyl, lower alkoxy, nitro, cyclohexyl, benzyl or phenyl. The terms "lower alkyl" or "lower alkoxy" refer to those radicals containing from 1 to 4 carbon atoms, inclusive. These compounds are crystalline solids somewhat soluble in many organic solvents and of low solubility in water. They have been found to be useful as parasiticides and are adapted to be employed as active toxic constituents of compositions for the control of insects, lampreys, fish and fungi such as *Penicillium digitatum* and *Rhizoctonia solani*.

The new compounds may be prepared by reacting a benzoyl halide of the formula

wherein X represents a halogen preferably chlorine or bromine with an alkali metal salt of 2-nitro-3,4,6-trichlorophenol. The alkali metal salt employed is preferably the potassium or sodium salt and may be prepared by reacting an excess of potassium hydroxide or sodium hydroxide with the phenol in water or other inert solvent. The reaction between the benzoyl halide and the alkali metal salt is carried out in the presence of an inert solvent such as benzene, carbon tetrachloride or ethylene dichloride and conveniently in the water employed in the preparation of the alkali metal salt. The reaction may be effected in the presence of a catalytic amount of a catalyst such as sulfuric acid or stannic chloride. Good results are obtained when employing equi-molecular proportions of the benzoyl halide and alkali metal phenolate. The reaction is somewhat exothermic and takes place smoothly at the temperature range of from 0° to 100° C. with the formation of the desired product and alkali metal halide of reaction. The temperature may be controlled by regulating the rate of contacting the reagents and by external cooling.

In carrying out the reaction, the benzoyl halide, alkali metal phenolate and catalyst, if employed, are contacted together in the reaction medium with stirring and at a temperature of from 0° to 100° C. Upon completion of the reaction, the reaction mixture may be washed with water and any water-immiscible solvent removed by evaporation to obtain the desired product as a crystalline residue. When water is employed as reaction solvent, the desired product precipitates during the course of the reaction and is separated by filtration or decantation. The product may be purified by recrystallization from a suitable organic solvent.

The following examples illustrate the invention but are not to be construed as limiting:

*Example 1.—2-nitro-3,4,6-trichlorophenyl benzoate*

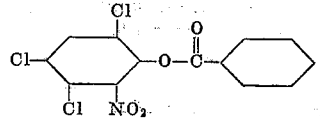

Potassium 2-nitro-3,4,6-trichlorophenolate was prepared by adding portionwise a solution of 22.5 grams (0.412 mole) of potassium hydroxide in 100 milliliters of water to a solution of 50 grams (0.206 mole) of 2-nitro-3,4,6-trichlorophenol in 50 milliliters of water. The addition was carried out over a period of 20 minutes and at a temperature of from 24° to 48° C. To the potassium salt solution thus formed there was added portionwise with stirring 29 grams (0.206 mole) of benzoyl chloride. The addition was carried out over a period of 14 minutes and at a temperature of from 24° to 43° C. Following the addition, stirring was continued for one hour, and the reaction mixture filtered to separate a 2-nitro-3,4,6-trichlorophenyl benzoate product as a crystalline residue. This product was recrystallized from isopropyl alcohol and found to have a melting point of 126.7°–127.4° C., and carbon and chlorine contents of 45.55 percent and 31.42 percent, respectively, as compared to the calculated values of 45.20 percent and 30.98 percent, respectively.

*Example 2.—2-nitro-3,4,6-trichlorophenyl 2-chlorobenzoate*

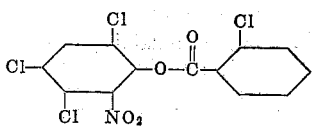

An aqueous solution of potassium 2-nitro-3,4,6-trichlorophenolate was prepared as described in Example 1 by reacting 22.5 grams (0.412 mole) of potassium hydroxide with 50 grams (0.206 mole) of 2-nitro-3,4,6-trichlorophenol in 150 milliliters of water. To the potassium salt solution thus formed was added portionwise with stirring 36.1 grams (0.206 mole) of 2-chlorobenzoyl chloride. The addition was carried out over a period of 20 minutes and at a temperature of from 24° to 46° C. Heating was thereafter continued for a period of 3 hours and at a temperature of from 58° to 65° C. The reaction mixture was then filtered to separate a 2-nitro-3,4,6-trichlorophenyl 2-chlorobenzoate product as a crystalline solid. This product was washed successively with 10 percent aqueous sodium bicarbonate, isopropyl alcohol and water and oven dried at 57° C. The dried product melted at 110.4° C. and contained 35.59 percent chlorine and 42.12 percent carbon compared to the theoretical values of 36.1 percent and 41.2 percent, respectively.

*Example 3.—2-nitro-3,4,6-trichlorophenyl 4-chlorobenzoate*

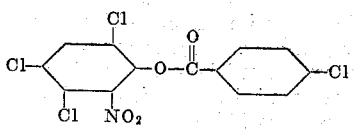

An aqueous solution of potassium 2-nitro-3,4,6-trichlorophenolate was prepared as described in Example 1 by the reaction of 16.9 grams (0.308 mole) of potassium hydroxide and 50 grams (0.206 mole) of 2-nitro-3,4,6- trichlorophenol in 150 milliliters of water. To the resulting solution was added portionwise with stirring 72.1 grams (0.412 mole) of 4-chlorobenzoyl chloride. The addition was carried out over a period of 15 minutes and at a temperature of from 25° to 38° C. Stirring was thereafter continued for 45 minutes. The reaction mixture was then processed as described in Example 2 to obtain a 2-nitro-3,4,6-trichlorophenyl 4-chlorobenzoate product as a white solid which melted at 103.8°–105.0° C. This product was found to contain 35.88 percent chlorine compared to the calculated value of 36.1 percent.

*Example 4.—2-nitro-3,4,6-trichlorophenyl 3,4-dichlorobenzoate*

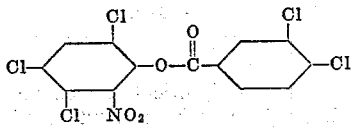

86.4 grams (0.412 mole) of 3,4-dichlorobenzoyl chloride was added portionwise with stirring to an aqueous solution containing 0.206 mole of potassium 2-nitro-3,4,6-trichlorophenolate prepared as described in Example 1. The addition was carried out over a period of 20 minutes and at a temperature of from 28° to 37° C. Following the addition, heating was continued for a period of 3 hours and at a temperature of from 55° to 58° C., and the reaction mixture thereafter processed as described in Example 2 to obtain a 2-nitro-3,4,6-trichlorophenyl 3,4-dichlorobenzoate product as a yellow solid. This product melted at 123.8°–125.0° C. and contained 42.38 chlorine compared to the theoretical value of 42.70 percent.

*Example 5.—2-nitro-3,4,6-trichlorophenyl 4-nitrobenzoate*

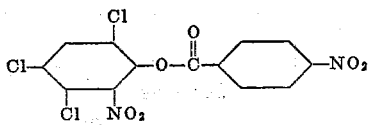

An aqueous solution containing 0.206 mole of potassium 2-nitro-3,4,6-trichlorophenolate was prepared as described in Example 1. To the resulting solution was added portionwise with stirring 38.2 grams (0.206 mole) of 4-nitrobenzoyl chloride. The addition was carried out over a period of 15 minutes and at a temperature of from 24° to 34° C. Following the addition, heating was continued for 2½ hours at a temperature of from 55° to 60° C. and the reaction mixture thereafter processed as described in Example 2 to obtain a 2-nitro-3,4,6-trichlorophenyl 4-nitrobenzoate product as a tan solid. This product melted at 147.5°–147.9° C. and contained 26.93 percent chlorine and 40.88 percent carbon compared to the theoretical values of 27.20 percent and 40.20 percent, respectively.

*Example 6.—2-nitro-3,4,6-trichlorophenyl 3,5-dinitrobenzoate*

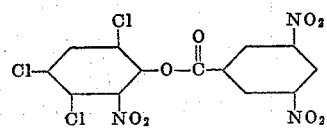

An aqueous solution containing 0.206 mole of potassium 2-nitro-3,4,6-trichlorophenolate was prepared as described in Example 1. To the resulting solution was added portionwise with stirring 95.2 grams (0.412 mole) of 3,5-dinitrobenzoyl chloride over a period of 20 minutes and at a temperature of from 24° to 31° C. Heating was thereafter continued for a period of 3 hours and at a temperature of from 55° to 60° C., and the reaction mixture thereafter processed as described in Example 2 to obtain a 2-nitro-3,4,6-trichlorophenyl 3,5-dinitrobenzoate product as a white solid. This product melted at 142.5°–143.3° C. and contained 23.98 percent chlorine compared to the theoretical content of 24.3 percent.

*Example 7.—2-nitro-3,4,6-trichlorophenyl 2-methoxybenzoate*

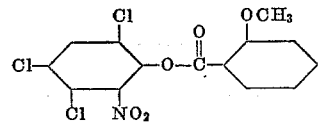

70.4 grams (0.412 mole) of 2-methoxybenzoyl chloride was added portionwise with stirring to an aqueous solution containing 0.206 mole of potassium 2-nitro-3,4,6-trichlorophenolate prepared as described in Example 1. The addition was carried out over a period of 20 minutes and at a temperature of from 24° to 48° C. Stirring was thereafter continued for about 30 minutes. Upon completion of the reaction, the white solid formed was removed by filtration, washed successively with a 20 percent aqueous sodium bicarbonate solution and isopropyl alcohol and oven dried at 57° C. As a result of these operations, there was obtained a 2-nitro-3,4,6-trichlorophenyl 2-methoxybenzoate product which was found to melt at 115.0°–115.8° C. and contain 27.81 percent chlorine and 45.12 percent carbon compared to the theoretical values of 28.2 percent and 44.9 percent, respectively.

*Example 8.—2-nitro-3,4,6-trichlorophenyl 4-methoxybenzoate*

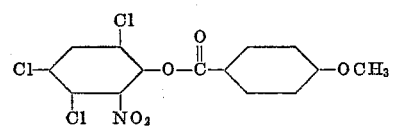

This compound was prepared in the same manner and under the same reaction conditions as that described in Example 7 by the reaction of 0.206 mole of potassium 2-nitro-3,4,6-trichlorophenolate and 0.412 mole of 4-methoxybenzoyl chloride. Upon completion of the reaction, the reaction mixture was processed as described in Example 7 to obtain a 2-nitro-3,4,6-trichlorophenyl 4-methoxybenzoate product as a cream-colored solid. This product melted at 165.5°–166.5° C. and contained 27.74 percent chlorine compared to the theoretical value of 28.2 percent.

In a similar manner other 2-nitro-3,4,6-trichlorophenyl benzoates may be prepared of which the following are representative:

2-nitro-3,4,6-trichlorophenyl 2-methyl-4-chlorobenzoate by the reaction of potassium 2-nitro-3,4,6-trichlorophenolate and 2-methyl-4-chlorobenzoyl chloride.

2-nitro-3,4,6-trichlorophenyl 2-chloro-4-nitrobenzoate by the reaction of sodium 2-nitro-3,4,6-trichlorophenolate and 2-chloro-4-nitrobenzoyl chloride.

2-nitro-3,4,6-trichlorophenyl 4-tertiarybutylbenzoate by the reaction of sodium 2-nitro-3,4,6-trichlorophenolate and 4-tertiarylbutyl benzoyl bromide.

2-nitro-3,4,6-trichlorophenyl 2,4,5-trichlorobenzoate by the reaction of potassium 2-nitro-3,4,6-trichlorophenolate and 2,4,5-trichlorobenzoyl iodide.

2-nitro-3,4,6-trichlorophenyl 2-ethyl-4-nitrobenzoate by the reaction of potassium 2-nitro-3,4,6-trichlorophenolate and 2-ethyl-4-nitrobenzoyl fluoride.

2-nitro-3,4,6-trichlorophenyl 2-bromo-3,5-dinitrobenzoate by the reaction of sodium 2-nitro-3,4,6-trichlorophenolate and 2-bromo-3,5-dinitrobenzoyl chloride.

2-nitro-3,4,6-trichlorophenyl 3-nitro-4-methoxybenzoate by the reaction of sodium 2-nitro-3,4,6-trichlorophenolate and 3-nitro-4-methoxybenzoyl bromide.

2-nitro-3,4,6-trichlorophenyl pentachlorobenzoate by the reaction of sodium 2-nitro-3,4,6-trichlorophenolate and pentachlorobenzoyl bromide.

2-nitro-3,4,6-trichlorophenyl 3-bromo-4-ethoxybenzoate by the reaction of sodium 2-nitro-3,4,6-trichlorophenolate and 3-bromo-4-ethoxybenzoyl iodide.

2-nitro-3,4,6-trichlorophenyl 2-propyl-4-bromobenzoate by the reaction of potassium 2-nitro-3,4,6-trichlorophenolate and 2-propyl-4-bromobenzoyl fluoride.

2-nitro-3,4,6-trichlorophenyl 2,3,4-trimethoxybenzoate by the reaction of sodium 2-nitro-3,4,6-trichlorophenolate and 2,3,4-trimethoxybenzoyl chloride.

2-nitro-3,4,6-trichlorophenyl 4-cyclohexylbenzoate by the reaciton of sodium 2-nitro-3,4,6-trichlorophenolate and 4-cyclohexylbenzoyl chloride.

2-nitro-3,4,6-trichlorophenyl 3-benzylbenzoate by the reaction of potassium 2-nitro-3,4,6-trichlorophenolate and 3-benzylbenzoyl chloride.

2-nitro-3,4,6-trichlorophenyl 2-phenylbenzoate by the reaction of potassium 2-nitro-3,4,6-trichlorophenolate and 2-phenylbenzoyl bromide.

The compounds of the present invention have been found to be useful as herbicides and parasiticides. For such use, the compounds may be dispersed on a finely divided solid and employed as dusts. The new products may also be employed in oils, as constituents of aqueous emulsions or in aqueous dispersions. In representative operations, substantially 100 percent controls of southern army worms and two-spotted spider mites have been obtained when employing an aqueous solution containing 1200 parts by weight of 2-nitro-3,4,6-trichlorophenyl 3,4-dichlorobenzoate per million parts by weight of ultimate mixture.

The benzoyl halides employed as starting materials in the present invention may be prepared in conventional manner by the reaction of benzoic acid or a substituted benzoic acid with an excess of phosphorus pentahalide or thionyl halide. When a phosphorus pentahalide is employed, the reaction takes place smoothly upon standing at room temperature for a period of time. When a thionyl halide is employed, the reaction mixture is heated at the boiling temperature and under reflux for a period of time to complete the reaction. The desired product is then isolated and purified by fractional distillation of the reaction mixture under reduced pressure.

We claim:
1. A 2-nitro-3,4,6-trichlorophenyl benzoate corresponding to the general formula

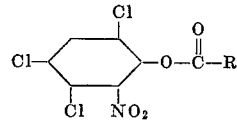

wherein R represents an aryl radical of the benzene series.
2. 2-nitro-3,4,6-trichlorophenyl benzoate.
3. 2-nitro-3,4,6-trichlorophenyl 4-methoxybenzoate.
4. 2-nitro-3,4,6-trichlorophenyl 4-nitrobenzoate.
5. 2-nitro-3,4,6-trichlorophenyl 3,4-dichlorobenzoate.
6. 2-nitro-3,4,6-trichlorophenyl 2,4,5-trichlorobenzoate.
7. A method of preparing a 2-nitro-3,4,6-trichlorophenyl benzoate corresponding to the general formula

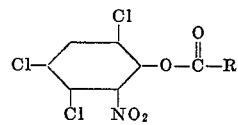

wherein R represents an aryl radical of the benzene series, which comprises reacting an alkali metal 2-nitro-3,4,6-trichlorophenolate with a benzoyl halide of the formula $$R-C\diagdown_{X}^{\diagup O}$$

wherein R is an aryl radical and X represents a halogen, the reaction being carried out at a temperature of from 0° to 100° C.

References Cited in the file of this patent

Groves et al.: Chem. Abst., 23, 2957 (1929).
Kohn et al.: ibid., 25, 4537 (1931).
Dormal et al.: ibid., 45, 5860 (1951).
Maruyama et al.: ibid., 49, 216 (1955).